United States Patent

[11] 3,561,733

| [72] | Inventors | Charles G. Formeck<br>Jackson Heights;<br>Leon J. Harris, Jr., Covington, Va. |
|---|---|---|
| [21] | Appl. No. | 748,696 |
| [22] | Filed | July 30, 1968 |
| [45] | Patented | Feb. 9, 1971 |
| [73] | Assignee | Westvaco Corporation<br>New York, N.Y.<br>a corporation of Delaware |

[54] VACUUM SLURRY SYSTEM
4 Claims, 1 Drawing Fig.

| [52] | U.S. Cl. | 259/18 |
|---|---|---|
| [51] | Int. Cl. | B01f 5/10 |
| [50] | Field of Search | 259/4, 18, 30, 60, 95, 115; 15/353 |

[56] References Cited
UNITED STATES PATENTS

| 1,123,542 | 1/1915 | Janensch | 259/95 |
|---|---|---|---|
| 2,972,769 | 2/1961 | Keating et al. | 15/353X |

FOREIGN PATENTS

| 375,074 | 5/1907 | France | 15/353 |

*Primary Examiner*—Edward L. Roberts
*Attorney*—James L. Neal

ABSTRACT: Powdered, activated carbon is mixed with a slurrying agent, such as water, by drawing the powdered carbon by means of a vacuum beneath the surface of the slurrying agent.

PATENTED FEB 9 1971
3,561,733
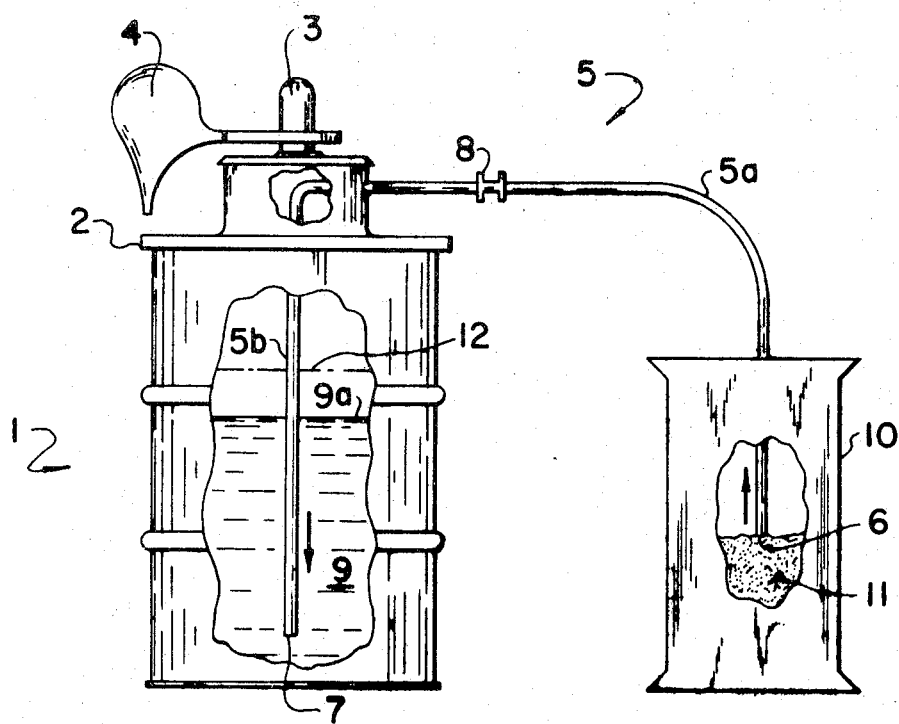
INVENTOR.
CHARLES G. FORMECK
LEON J. HARRIS, JR.
BY
Thomas W. Flynn

VACUUM SLURRY SYSTEM

BACKGROUND OF THE INVENTION

1. Field of the Invention

Method and apparatus for mixing liquids and solids.

2. Description of the Prior Art

Powdered activated carbon is used extensively for controlling color, taste, and odor, particularly in water supply systems. The powdered activated carbon used for this purpose is a very finely divided material with a particle size that may be so small that 95 percent will pass a 325 mesh screen. The carbon particles are also extremely porous and readily adsorb air or other gaseous materials. In utilizing powdered, activated carbon in, for example, a water supply system, the carbon is first mixed with a quantity of a slurrying agent, such as water, and the resulting slurry added to the water supply system in the concentration necessary to obtain effective taste and odor control. As a practical matter, it is felt that because of the low concentrations of powdered activated carbon necessary for purification purposes, a more accurate dosage is obtainable by first slurrying the carbon rather than adding the powdered carbon directly to the medium being treated. However, because of the extremely fine particle size of the carbon and the fact that the carbon particles may contain a quantity of air, the carbon exhibits a high degree of resistance to wetting and it has proven difficult to obtain a uniform dispersion of the carbon throughout the slurrying agent without elaborate mixing equipment. It should be noted also, that because in many cases, water supply systems are treated with carbon only during two or three summer months when taste and odor becomes a problem, the expenditures required for elaborate mixing equipment are not generally justified. Therefore, in many installations the only alternative is to attempt to mix the carbon by hand with a paddle or the like. This has proven an extremely time consuming and laborious project which results, not only in a very dirty operation with an appreciable loss of carbon through spillage, but usually, in a slurry of less than homogenous character.

SUMMARY OF THE INVENTION

The present invention provides a method and apparatus for efficiently, quickly, and inexpensively dispersing a finely divided material such as powdered, activated carbon throughout a slurrying agent such as water. According to the present invention, the powdered, activated carbon is removed from its container by means of a vacuum and, entrained with large quantities of air, it is ejected beneath the surface of the slurrying agent to obtain a thorough mixing of the carbon and the agent. It is believed that by removing the carbon from its container by means of a vacuum a certain amount of deaeration of the carbon particles takes place; thereby permitting a more efficient wetting of the carbon. This feature, in combination with the fact that the carbon is introduced into the slurrying agent beneath the surface thereof, is believed to be responsible for the efficiency with which the present invention provides a homogenous slurry.

BRIEF DESCRIPTION OF THE DRAWINGS

The drawing shows, with portions broken away for clarity, apparatus for carrying out the present invention.

DESCRIPTION OF A PREFERRED EMBODIMENT

Referring now to the drawing, it will be seen that the apparatus of the present invention may comprise a drum 1 having an airtight cover 2. Mounted on the cover is a vacuum motor 3 which may be of conventional design, including a dust bag 4. Conduit means 5 having an inlet end 6 and an outlet end 7 is also mounted on the cover 2 with the outlet end of the conduit positioned adjacent the bottom of the drum 1. It will also be noted that the conduit means 5 is comprised to two portions including a flexible portion 5A positioned upstream of the coupling 8 and a rigid portion extending down stream from the coupling 8.

In operation, a predetermined amount of a slurrying agent 9 is placed in the container 1; the slurrying agent having a surface 9A. The vacuum motor 3 is then started to create a reduced pressure between the lower surface of a cover 2 and the surface 9A of the slurrying agent. Next, a container 10 of a finely divided material 11 is opened and the flexible portion 5A of the conduit means 5 is placed therein. This causes the finely divided material 11 to be drawn up through the conduit means 5 and into the container 1 below the surface 9A of the slurrying agent. Due, it is believed, to the fact that the finely divided material 11 is conveyed under a reduced pressure to the container 1 and is thereby deaerated to some extent, and also, to the fact that the material 11 is introduced into the container 1 below the surface 9A of the slurrying agent, an efficient and uniform dispersion of the material 11 in the slurrying agent is obtained.

In an actual operation in which a slurry of powdered, activated carbon and water was to be prepared for water purification purposes, the container 1, a 55 gallon drum, was filled with water to a depth of 20 inches. The cover 2 was then placed on the container 1. Next, a bag 10 of powdered activated carbon was opened, the exhaust motor 3 turned on, and the flexible portion sA of the conduit means 5 placed within the bag 10. The vacuum produced in the container 1 between the surface 9A of the water and the lower surface of the cover 2 was equal to approximately 15 inches of water and the total flow through the conduit means was approximately 183 cubic feet per minute. The powdered activated carbon was entrained in an air stream within the conduit means 5 with an approximate volumetric ratio of carbon to air of 1 to 4; that is, 20 percent carbon to 80 percent air. In approximately 3 minutes time, the entire contents of the bag 10 was uniformly dispersed throughout the water in the container 1 resulting in a slurry of approximately 35 gallons and raising the level in the container 1 to the point shown by phantom line 12.

From the above, it will be apparent that a quick, efficient and inexpensive method and apparatus has been devised for slurrying finely divided materials such as powdered activated carbon. While a particular embodiment has been described for purposes of illustration, it will be obvious that modifications thereof will readily occur to those skilled in the art within the scope of the appended claims.

We claim:

1. The method of forming a slurry of activated carbon in a liquid slurrying agent comprising:
   a. placing a liquid slurrying agent in a container in an amount less than the capacity of the container;
   b. sealing said container;
   c. applying a negative pressure to the interior of said container; and
   d. drawing activated carbon by means of said negative pressure into the interior of said container beneath the surface of said slurrying agent, the particles of said activated carbon being at least partially deaerated as said activated carbon is drawn into said container for increasing the susceptibility of said carbon particles to wetting by the slurrying agent.

2. The method of claim 1 wherein said activated carbon is introduced into said container by entraining said material in a stream of air.

3. The method of claim 2 wherein said activated carbon is introduced into said container in a volumetric ratio of approximately 20 percent finely divided material to 80 percent entraining air.

4. The method of claim 3 wherein said slurrying agent is water.